United States Patent
Paielli et al.

(10) Patent No.: US 11,746,873 B2
(45) Date of Patent: Sep. 5, 2023

(54) DIFFERENTIAL SYSTEM AND METHOD FOR OPERATION OF A DIFFERENTIAL SYSTEM

(71) Applicant: Dana Automotive Systems Group, LLC, Maumee, OH (US)

(72) Inventors: Perry M. Paielli, Sand Creek, MI (US); Michael Z. Creech, Ann Arbor, MI (US); Sagar B. Bangar, Ypsilanti, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/809,783

(22) Filed: Jun. 29, 2022

(65) Prior Publication Data

US 2022/0325787 A1 Oct. 13, 2022

Related U.S. Application Data

(62) Division of application No. 17/024,561, filed on Sep. 17, 2020, now Pat. No. 11,448,301.

(51) Int. Cl.
| | |
|---|---|
| *F16H 48/34* | (2012.01) |
| *F16H 48/20* | (2012.01) |
| *F16H 48/24* | (2006.01) |
| *F16D 27/118* | (2006.01) |

(52) U.S. Cl.
CPC ............ *F16H 48/34* (2013.01); *F16D 27/118* (2013.01); *F16H 48/24* (2013.01); *F16H 2048/204* (2013.01); *F16H 2048/346* (2013.01)

(58) Field of Classification Search
CPC . B60K 2023/046; F16H 2048/204–208; F16H 48/24; F16D 27/10–118; F16D 27/14
See application file for complete search history.

(56) References Cited

U.S. PATENT DOCUMENTS

| | | | |
|---|---|---|---|
| 7,241,243 | B2 | 7/2007 | Duncan |
| 7,425,185 | B2 | 9/2008 | Donofrio et al. |
| 7,682,279 | B2 | 3/2010 | Donofrio et al. |
| 7,942,780 | B2 | 5/2011 | Donofrio et al. |
| 8,276,725 | B2 * | 10/2012 | Swales ............... F16D 41/16 |
| | | | 192/84.92 |
| 8,978,600 | B2 * | 3/2015 | Shutty .................. F01P 7/164 |
| | | | 417/15 |
| 9,605,740 | B2 | 3/2017 | Povirk et al. |
| 9,777,819 | B2 | 10/2017 | Paielli et al. |

(Continued)

FOREIGN PATENT DOCUMENTS

| | | | | |
|---|---|---|---|---|
| CN | 108302134 A | * | 7/2018 | ............ F16D 27/14 |
| DE | 102007058552 A1 | * | 6/2009 | ........... F16D 27/004 |

*Primary Examiner* — Ernesto A Suarez
*Assistant Examiner* — James J Taylor, II
(74) *Attorney, Agent, or Firm* — McCoy Russell LLP

(57) ABSTRACT

Methods and systems for a locking differential are provided. The locking differential system includes an electromagnetic solenoid actuator designed to induce locking and unlocking of the differential and a circuit board assembly designed to programmatically control the locking and unlocking functionality. The circuit board assembly includes a sensor and control circuity enclosed in a continuous sealed enclosure, the sensor extends down the face of a coil assembly in the solenoid.

17 Claims, 3 Drawing Sheets

(56) References Cited

U.S. PATENT DOCUMENTS

| | | |
|---|---|---|
| 9,812,238 B2 | 11/2017 | Heravi et al. |
| 10,001,224 B2 | 6/2018 | Phillips et al. |
| 10,479,343 B2 | 11/2019 | Frait et al. |
| 10,839,999 B2 | 11/2020 | Cayton et al. |
| 2015/0136559 A1* | 5/2015 | Brumberger .......... F16D 48/064 |
| | | 192/84.9 |
| 2015/0204393 A1* | 7/2015 | Holmes .................. B60L 50/51 |
| | | 192/84.6 |
| 2019/0195327 A1 | 6/2019 | Creech et al. |
| 2020/0040994 A1 | 2/2020 | Gebert et al. |
| 2021/0095782 A1 | 4/2021 | Nakanishi et al. |
| 2021/0265794 A1 | 8/2021 | Diessl et al. |

* cited by examiner

DIFFERENTIAL SYSTEM AND METHOD FOR OPERATION OF A DIFFERENTIAL SYSTEM

CROSS REFERENCE TO RELATED APPLICATION

The present application is a divisional of U.S. Non-Provisional patent application Ser. No. 17/024,561, entitled "DIFFERENTIAL SYSTEM AND METHOD FOR OPERATION OF A DIFFERENTIAL SYSTEM", and filed on Sep. 17, 2020. The entire contents of the above-listed application are hereby incorporated by reference for all purposes.

TECHNICAL FIELD

The present disclosure generally relates to a locking differential assembly in a vehicle. More particularly, the present disclosure relates to a solenoid actuator as well as control and sensing circuitry of the actuator.

BACKGROUND AND SUMMARY

Some drivetrains include differentials with locking capabilities which when activated, prevent speed differentiation between drive wheels. In certain locking differentials, electronic actuators are used, owing in part to their quicker actuation times and increased durability in comparison to certain pneumatic locking systems and other types of locking mechanisms.

US 2019/0195327 A1 to Creech et al. teaches an electronic differential locker with a sensor adjacent to a locking armature. The inventors have recognized several drawbacks with US 2019/0195327 A1 and other electronic locking mechanisms. Although, US 2019/0195327 A1 generally teaches a controller and a sensor coupled to the electronic actuator, the controller's programmatic capabilities are limited to electrically energizing the actuator in the differential assembly. Moreover, the controller is spaced away from the sensor and exhibits a bulky profile which may pose packaging challenges in space constrained differentials.

Furthermore, the components in the electrical differential locker disclosed in US 2019/0195327 A1 are located in a relatively harsh interior environment of the differential. For instance, these components may experience elevated levels of heat and vibration and may be exposed to oil. These environment conditions may increase the likelihood of component degradation, in comparison to electronics spaced away from the differential. Other electronically actuated differential systems have relied on remotely located controllers to implement more complex control strategies. However, when vehicles deploy this type of system, design of the locking mechanism's control logic (e.g., population and calibration of circuitry) at a separate stage from the manufacture and assembly of the differential may be demanded. The precision of current control to the locking mechanism be decreased due to the uncoordinated differential and control logic manufacturing steps.

To overcome at least some of the aforementioned challenges, a differential system is provided. The differential system, in one example, comprises an electromagnetic solenoid actuator that includes a coil assembly and a piston. The piston is configured to selectively induce locking and unlocking of axle shaft speed differentiation in the differential. The system further comprises a circuit board assembly configured to programmatically control the electromagnetic solenoid actuator. The circuit board assembly includes control circuitry and a sensor that is configured to sense a position of the piston and radially extends down a face of the coil assembly. Further, in the system, the sensor and the control circuitry are enclosed in a sealed housing. In this way, a sensor and control circuitry are compactly incorporated into a locking differential and achieve desired thermodynamic characteristics which reduce the likelihood of the electronic components experiencing over-temperature conditions. The system's applicability and customer appeal may be increased as a result of the reliable and space efficient control and sensor circuitry arrangement.

In another example, the circuit board assembly may further include executable instructions stored in non-transitory memory that cause the circuit board assembly to periodically place the circuit board assembly in a lower power consuming state for a selected duration. In this way, the control circuitry may be put to sleep for a desired duration to decrease the circuit's power consumption and temperature, correspondingly. Accordingly, the chance of the circuit experiencing over-temperature conditions may be further reduced and customer appeal may be correspondingly increased. Further, in one example, the duration of circuit's sleep state may be less than the time scale of the locking mechanism operation. In this way, the differential retains locking functionality while the control circuitry is put to sleep periodically.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
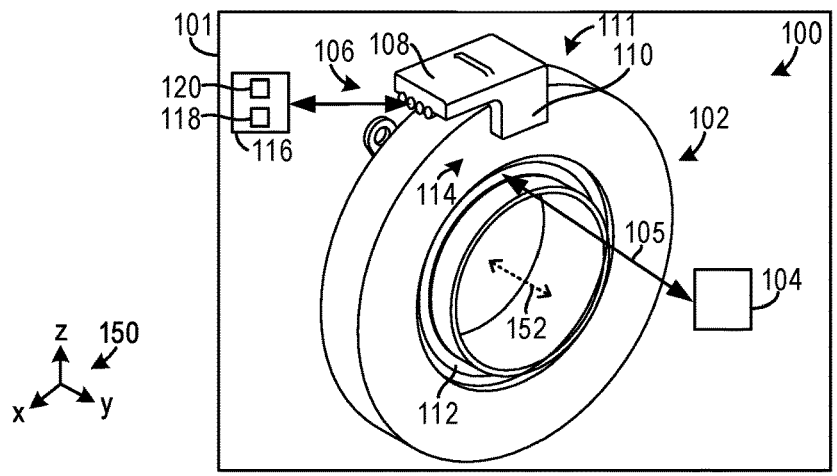
FIG. 1 shows an illustration of an embodiment of a differential system with a circuit board assembly.
Figure 2:
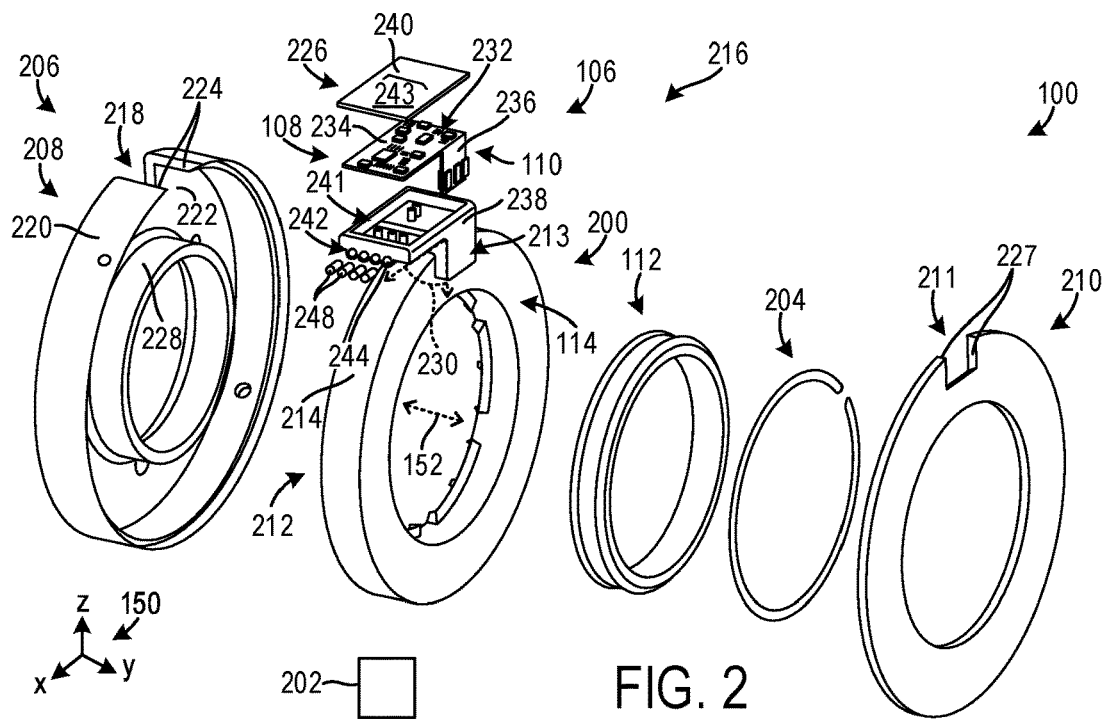
FIG. 2 shows an exploded view of the differential system and circuit board assembly, depicted in FIG. 1.
Figure 3:
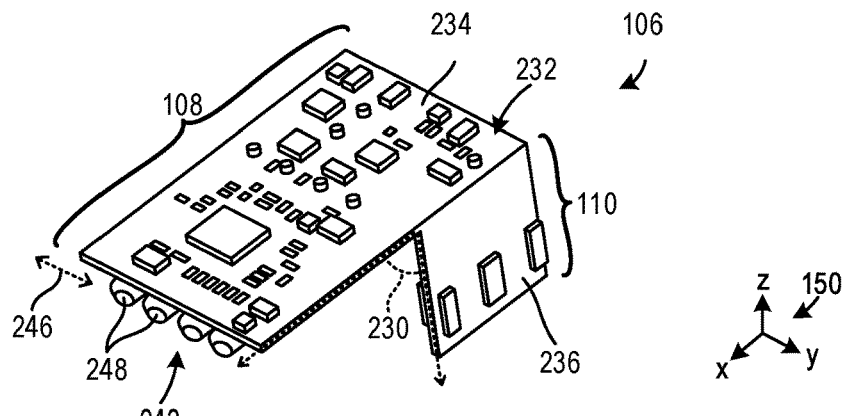
FIG. 3 shows a detailed view of the circuit board, depicted in FIG. 2.

FIGS. 1-3 are drawn approximately to scale. However, other relative component dimensions may be used, in other embodiments.

A differential system with an electronic locking mechanism and control strategy for the locking mechanism is described herein. The differential system includes a circuit assembly with a control board and an actuator sensor. The control board and sensor form a common structure that is coupled to the locking mechanism's electronic actuator. Packaging the sensor and control circuitry in a common structure within the differential enclosure allows downstream vehicle manufacturers to forgo populating and calibrating the electronic locker's control circuitry, if desired. The differential system's market appeal is consequently increased. Incorporating the control circuitry and sensor into the locking mechanism's electronic actuator may allow the precision of actuator control to be increased, if wanted. To elaborate, in certain manufacturing scenarios, the control strategy for the solenoid actuator may unfold with greater precision due to cooperative manufacture of the control circuitry and the solenoid actuator. The coordinated manufacture of the control circuit and the solenoid actuator may allow the actuator to be calibrated to achieve even greater control precision, which further increases the solenoid's performance.

In the system, the control circuitry and internal logic are designed to enable the electronics to withstand the relatively high temperatures experienced inside the differential, efficiently dissipate heat generated by the control circuitry, and cooperatively seal the control circuitry and an actuator sensor. In this way, the locking mechanism's circuitry may be deployed in axle enclosures that may impose space constraints and relatively small thermal margins for circuit operation (around 5° C., in certain use-cases). In one example, the sensor may extend in a plane parallel to a face of the actuator and form an L-shape with a control circuit board to achieve targeted thermodynamic, sensing, and sealing characteristics. Consequently, the system's reliability may be increased due to a reduction in the chance of the circuitry experiencing over-temperature conditions or degradation caused by lubricant interfering with the circuitry. To elaborate, the control circuit board may confidently implement locking control and diagnostic strategies, even when deployed in an environment with comparatively high expected operating temperatures. Further, in one example, the control circuitry may be periodically put to sleep (e.g., a lower or near zero power consuming state) for a selected duration which reduces the temperature of the circuitry. In this way, the circuit may be designed to cope with the higher temperature conditions inside some differentials. The circuitry's sleep duration may be selected to reduce the circuit's power consumption while the differential's locking functionality remains operational. For instance, the sleep duration may be less than the time scale of the locking mechanism's energization control. In this way, the locking mechanism's control circuitry may be put to sleep to reduce the heat generated by the circuit and allow the circuitry to remain with targeted thermal margins. The circuitry may therefore be deployed in a wide variety of differentials, such as differentials which may reach high temperatures (e.g., around 150° C. in certain scenarios) during operation.

Figure 4:
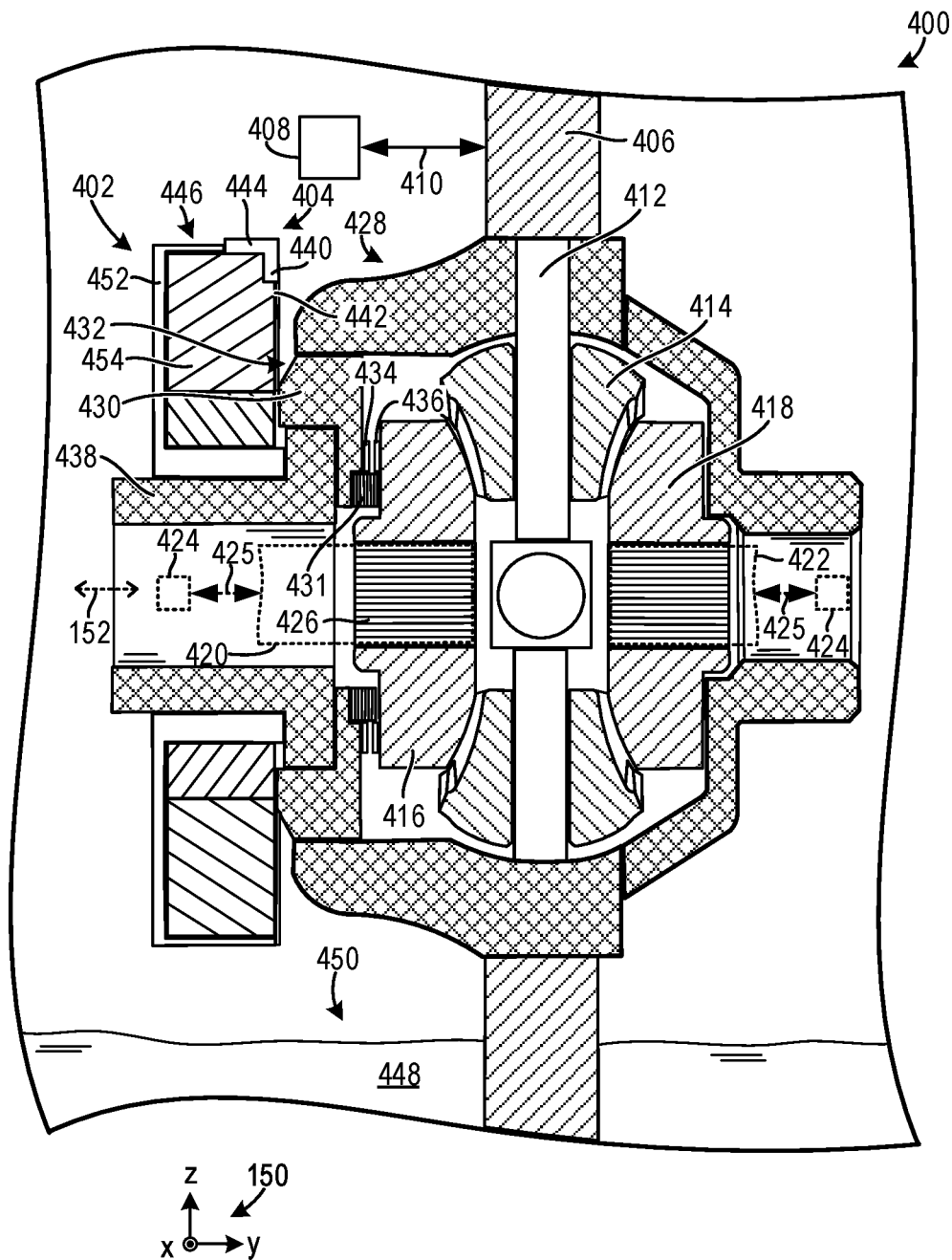
FIG. 4 shows a cross-sectional view of a use-case differential incorporating the circuit board assembly, depicted in FIGS. 1-3.
Figure 5:
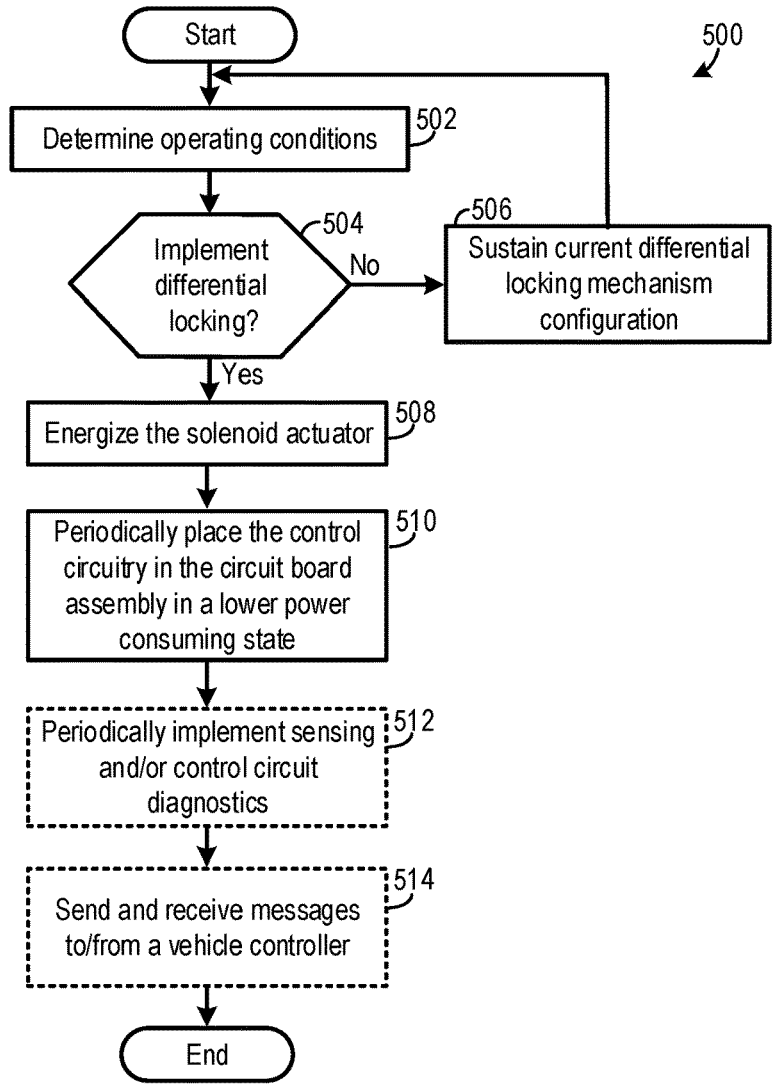
FIG. 5 shows a method for operation of a differential system.
Figure 6:
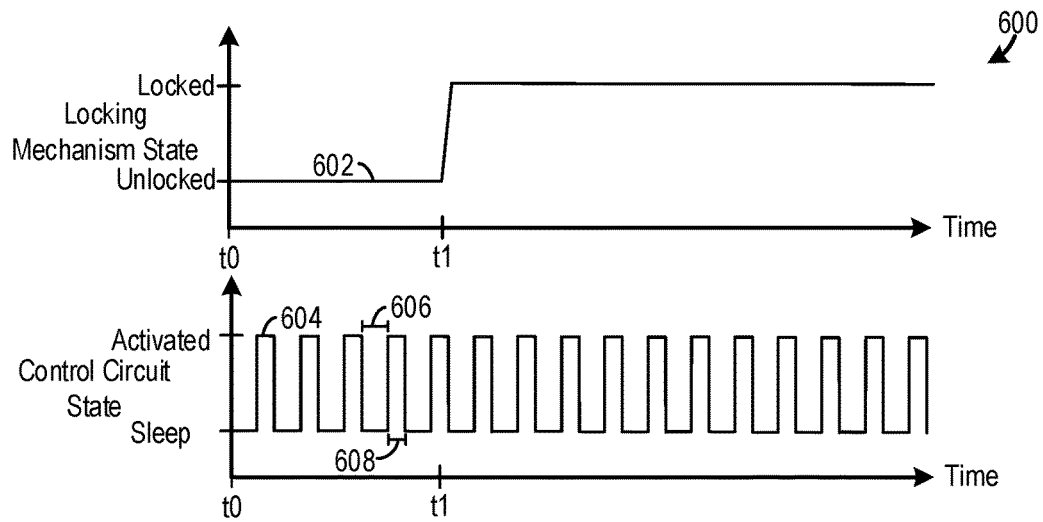
FIG. 6 shows a timing diagram of a use-case control strategy for a differential system.

FIGS. 1-2 show a differential system with a circuit board assembly for a locking mechanism which is thermodynamically designed to function in higher temperature environments. FIG. 3 shows a detailed view of the circuit board assembly which is shaped to facilitate solenoid actuator sensing and space the control circuit away from the solenoid's heat generating coils. FIG. 4 shows a cross-sectional depiction of a differential embodiment that employs the circuit board assembly with control, sensing, and diagnostic circuitry for the locking mechanism's solenoid actuator. FIG. 5 shows a method for operating a differential system and triggering differential locking as well as operating the circuitry in a lower power consuming state. FIG. 6 shows a timing diagram for a use-case differential system control strategy which periodically places the control circuitry in a lower power state while locking operation unfolds to reduce circuitry heat generation.

FIG. 1 shows a differential system 100 (e.g., locking differential system). The differential system 100 may be included in a vehicle schematically depicted at 101. The vehicle 101 may be a light, medium, or heavy duty vehicle. Said vehicle, in one example, may be a vehicle utilizing an internal combustion engine as a motive power source. In another example, said vehicle may be an electric vehicle, such as a battery electric vehicle (BEV) or a hybrid electric vehicle. In the hybrid vehicle example, both the motor system and an internal combustion engine may be used to generate motive power, while in the BEV example the internal combustion engine may be omitted. A BEV may have a less complex powertrain configuration which may drive down the chance of powertrain degradation, in certain cases.

The differential system 100 includes an electromagnetic solenoid actuator 102 designed to induce locking and unlocking of a differential locking mechanism schematically depicted at 104. Arrows 105 indicate the locking and unlocking action between the actuator and the locking mechanism. The differential locking mechanism may include components such as a locking plate designed to engage and disengage speed differentiation between the differential's side gears. Although the differential locking mechanism is schematically illustrated, it will be understood that the locking mechanism has greater structural complexity, which is expanded upon herein with regard to the FIG. 4. As described herein, when the differential is locked, speed differentiation between axle shafts is substantially inhibited and when the differential is unlocked, speed differentiation between the axle shafts is permitted.

A circuit board assembly 106 is further provided in the differential system 100. The circuit board assembly 106 includes control circuitry 108 and a sensor 110. In one example, the control circuitry 108 may be positioned on an upper side 111 of the solenoid actuator 102. Positioning the control circuit on the upper side of the actuator enables the circuit to be spaced away from a lubricant sump. The sensor 110 is designed to sense the position of a piston 112 in the solenoid actuator 102. Specifically, in one example, the sensor 110 may be an eddy current sensor. However, other suitable sensors have been envisioned. Thus, the sensor 110 may send signals indicative of the piston's position to the control circuitry in the circuit board assembly. The sensor 110 may extend down a first face 114 of the solenoid actuator 102. In this way, the sensor 110 may be arranged in a desired orientation to achieve targeted solenoid sensing functionality. To elaborate, the sensor 110 may be arranged parallel to the plane of the solenoid actuator face 114.

The circuit board assembly 106 may be in electronic communication with a vehicle controller 116 (e.g., electronic control unit (ECU)) via wired and/or wireless communication. The vehicle controller 116 may therefore be spaced away from the circuit board assembly. The vehicle controller may be designed to implement control strategies such as engine control, motor control, powertrain control, and the like. The circuit board assembly 106 may send rapidly distinguishable messages, such as messages indicating the circuit board assemblies state (e.g., activated higher power consuming state or a lower power consuming state (sleep state)), to the vehicle controller. To accomplish the aforementioned vehicle control functionality, the vehicle controller may include a memory 118 storing instructions executable by a processor 120 to carry out the vehicle control strategies.

An axis system 150 is provided in FIG. 1 as well as FIGS. 2-4, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A central axis 152 of the differential system 100 is further provided in FIG. 1 and FIGS. 2 and 4, for reference. It will be understood that the central axis 152 may be the rotational axis of the axle shafts in the differential system. As described herein, axial movement may refer to a component's movement along a direction parallel to the central axis.

FIG. 2 shows an exploded view of the differential system 100. The electromagnetic solenoid actuator 102 and the circuit board assembly 106 are again depicted. As indicated above, the solenoid actuator 102 is designed to trigger differential locking and unlocking. To accomplish the locking-unlocking functionality, the electromagnetic solenoid actuator 102 includes a coil assembly 200 and the piston 112. The coil assembly 200 is electrically coupled to an energy source 202 (e.g., battery, capacitor, alternator, etc.). The coil assembly 200 may be energized to induce axial movement of the piston 112 to trigger locking and unlocking of the differential. The piston 112 may therefore function as an armature, in one example. In particular, the coil assembly 200 may be selectively energized and de-energized to induce activation and deactivation of the electromagnetic solenoid actuator 102. Activation and deactivation of the solenoid actuator causes differential locking and unlocking.

In one example, the electromagnetic solenoid actuator 102 may be activated via a multi-stage control strategy. Therefore, in some instances, the solenoid actuator may, in a first stage, be energized with a higher current to induce movement of the piston 112 and in a second stage, be energized via a lower current to hold the piston in a desired position. Thus, in one specific embodiment, the solenoid actuator may be activated via a peak and hold strategy where the current delivered to the solenoid is stepped down during activation. When the circuit board assembly 106 is incorporated into the differential and manufactured therewith, the precision in solenoid actuator control may be increased, thereby increasing actuator performance and vehicle handling performance, correspondingly. Incorporating the circuit board assembly 106 into the differential further enables the circuit board assembly 106 to be more precisely calibrated when manufactured, in certain cases. For instance, a sole manufacturer may assemble the differential and control circuitry and then subsequently calibrate the control circuitry. Consequently, the precision in solenoid actuator control may be further increased, which increases actuator performance.

The electromagnetic solenoid actuator 102 may further include a washer 204. The washer 204 may function to axially retain components in the actuator. The solenoid actuator 102 may further include a housing assembly 206. The housing assembly 206 may include a housing 208 and a plate 210. When assembled, the electromagnetic solenoid actuator 102 is fluidly sealed within the housing 208 and the plate 210. In this way, the solenoid may be protected from lubricating fluid (e.g., oil) within the differential enclosure. The plate 210, in one example, includes a recess 211 profiled to mate with the sensor extension 213 of a circuit board assembly housing 226, expanded upon herein. In this way, the circuit board assembly may be sealed with the solenoid actuator 102. The recess 211 may have a shape which correlates to the shape of the sensor 110. As such, in one example, the recess may have two opposing walls 227 which are parallel to one another and profiled to seal the sensor. However, other recess shapes have been contemplated.

The coil assembly 200 may include the first face 114 (e.g., inner axial face), a second face 212 (e.g., outer axial face) opposite the first face, and an outer circumferential surface 214 extending between the first and second faces. These solenoid components may enclose coil windings which when energized cause the piston 112 to move in an axial direction.

The control circuit 108 is designed to implement control and diagnostic strategies. For instance, the control circuit 108 may selectively energize the solenoid actuator to induce locking and unlocking of the differential based on one or more operating conditions. Various control and diagnostic strategies programmatically stored in the control circuit 108 are discussed in greater detail herein with regard to FIGS. 5-6. To accomplish the control and diagnostic functionality the control circuit 108 may include memory executable by a processor. The memory may store instructions executable by the processor to carry out the control methods, strategies, etc. described herein. To elaborate, the processor may include a microprocessor unit and/or other types of circuits. The memory may include known data storage mediums such as random access memory, read only memory, keep alive memory, combinations thereof, etc. The circuit board assembly 106 may be included in a control system 216 which further includes one or more input devices such a button, graphical user interface (GUI), knob, switch, slider, and the like which enable a system operator to initiate differential locking and unlocking functionality. Additionally or alternatively, the circuit board assembly 106 may be designed to programmatically lock and unlock the differential based on operating conditions such as vehicle speed, vehicle traction, vehicle load, and the like.

The housing 208 may include a cut-out 218 which extends through a circumferential surface 220 and an outer wall 222. The cut-out 218 mates and seals the circuit board assembly 106. In this way, circuit board assembly 106 may be space efficiently incorporated into the solenoid actuator while fluidly sealing the actuator from lubrication fluid present in the differential. The cut-out 218 may specifically include opposing walls 224. The profile of the walls 224 may correspond to the profile of the circuit board assembly housing 226. Specifically, in one example, the walls 224 may be parallel to one another to enable the circuit board assembly to be efficiently sealed with the solenoid actuator. However, other wall profiles have been envisioned. The actuator housing 208 may further include an inner circumferential extension 228 (e.g., annular extension) designed to mate with a section of the differential such as a differential case.

The control circuit 108 and the sensor 110 may form an L-shape, in one example. To elaborate, the sensor 110 may be arranged at a substantially perpendicular angle 230 to the control circuit 108. Thus, as shown the circuit board assembly 106 may include a continuous base 232 that comprises an upper section 234 and a side section 236 that radially extends towards the central axis 152. In this way, the sensor 110 may be arranged at a desired angle for sensing operation while allowing the control circuit to be spaced away from the solenoid coils which generate heat during operation.

The circuit board assembly 106 further includes the sealed housing 226 with a first section 238 which may have an L-shape profile corresponding to the L-shape of the underlying circuit board. The L-shaped housing allows the assembly to achieve a comparatively small package, sense solenoid actuator movement, and exhibit targeted thermal characteristics which reduces the heat of the circuit. A second section 240 (e.g., cover) may, when assembled, attach to the first section 238 to seal the circuit board therein. The second section 240 may include a planar face which increases heat transfer from the circuit to the surrounding environment while the housing achieves a space efficient profile. The second section 240 may mate in an opening 241 of the first section 238. The second section 240 further includes a planar top surface 243 which may be laterally aligned which allows the housing to transfer greater amounts of heat to the surrounding environment.

The housing 226 may include a wiring interface 242 (e.g., wiring harness). In one embodiment, the wiring interface 242 may be a controller area network (CAN) wiring interface with four wire ports 244, as illustrated. However, in other embodiments, the wiring interface 242 may be a local interconnect network (LIN) wiring interface with three wire ports (one signal wire, one power wire, and one ground wire). When a CAN wiring interface is deployed, degradation of the circuit board's components may be more easily identified. On other hand, when an LIN wiring interface is deployed, the likelihood of wire degradation is decreased, due to a reduction in wires and packaging of the circuit board assembly may be simplified, in certain scenarios. The wire ports 244 may be arranged along an axis 246, shown in FIG. 3, parallel to the central axis 152. In this way, the circuit board assembly 106 may achieve a space efficient form which spaces the heat producing sections of the board away from the coil assembly 200 which generates heat during operation. Consequently, the chance of the circuit board assembly's temperature surpassing a desired value may be reduced.

The circuit board assembly 106 may further include wire seals 248 coupled to the wiring interface 242 to reduce the chance of lubricant interfering with the wiring and entering the circuit board enclosure. In this way, the assembly's longevity may be further increased.

FIG. 3 shows a detailed depiction of the control circuit 108 and the sensor 110 in the circuit board assembly 106. As depicted, the continuous base 232 may be provided in the circuit board assembly. The continuous base 232 may include the upper section 234 with the control circuitry and the side section 236. Similar to the assembly's housing, the upper section 234 may be arranged at a substantially perpendicular angle 230 to the side section 236. This L-shaped board, allows the board to achieve desired sensing, sealing, and thermal characteristics, which increase the circuit board's longevity. The upper section 234 includes circuitry which may include memory and a processor designed to implement the control strategies, methods, and/or diagnostics described herein. The side section 236 includes circuitry such as eddy current sensor circuitry configured to sense movement of the solenoid piston. The board's wiring interface 242 is again shown with the wire seals 248 on the wire ports.

FIG. 4 shows a use-case example of a differential system 400. The differential system 400 includes an electromagnetic solenoid actuator 402 and a circuit board assembly 404 which may share at least some of the structural and functional features with the electromagnetic solenoid actuator 102 and the circuit board assembly 106, shown in FIGS. 1-3.

The differential system 400 may include a gear 406 (e.g., ring gear) which may be coupled to a drivetrain gear (e.g., pinion gear). The gear 406 may be rotationally coupled to a prime mover (e.g., internal combustion engine, motor, combinations thereof, and the like) schematically depicted at 408. Arrows 410 indicate the flow of power between the prime mover and the gear 406.

The gear 406 is coupled to a shaft 412 on which gears 414 (e.g., pinion gears) reside. The gears 414 are coupled to side gears 416, 418. In turn, the side gears 416, 418 are coupled to axle shafts 420, 422 (a pair of axle shafts) which may be rotationally coupled to drive wheels 424 indicated via arrows 425. Splines 426 and/or other suitable attachment interfaces may facilitate attachment between the axle shafts and the side gears 416, 418. The differential system 400 may further include a case 428 coupled to the gear 406.

A locking gear 430 in a locking device 432 of the differential system 400 may be actuated via the solenoid actuator 402. Thus, the locking gear 430 may be placed in an unlocked position and a locked position via the actuator. In the unlocked position, teeth 434 in the locking gear 430 are spaced away from teeth 436 in the side gear 416, in one example. Continuing with such an example, conversely, in the locked position, the teeth 434 in the locking gear 430 are mated with the teeth 436 in the side gear 416. In this way, the differential may be locked and unlocked via the locking device 432. However, other suitable types of locking mechanisms have been contemplated. The differential system may further comprise springs 431 arranged between the locking gear 430 and the side gear 416. The springs function to return the locking gear to an unlocked position. However, other locking device configurations have been contemplated.

The solenoid actuator 402 may be coupled to a body section 438. The circuit board assembly 404 again arranges a sensor 440 down a face 442 of the solenoid actuator 402. Control circuitry 444 may again laterally extend across a top side 446 of the solenoid actuator 402. In this way, the circuit board assembly 404 may be spaced away from lubricant 448 (e.g., oil) which is stored in a lubricant reservoir 450 (e.g., sump) of an axle housing. Consequently, the likelihood of the lubricant interfering with circuit operation is reduced. A housing 452 of the solenoid actuator 402 is further depicted in FIG. 4. The housing 452 at least partially encloses a coil assembly 454 in the solenoid actuator. Specifically, the housing 452 seals the coil assembly 454 and the circuit board assembly 404 to the solenoid actuator.

FIG. 5 shows a method 500 for operation of a differential system. The method 500 may be implemented by one or more of the differential systems and corresponding components, described above with regard to FIGS. 1-4. Therefore, the method 500 may be carried out via a circuit board assembly incorporated in a differential system. Further, the circuit board assembly may include a controller including memory holding instructions executable via a processor, as previously discussed.

At 502, the method includes determining operating conditions. The operating conditions may include ambient temperature, circuit board assembly temperature, electromagnetic solenoid actuator temperature, vehicle speed, vehicle load, operator input device configuration, etc. The operating conditions may be determined via sensing and/or modeling techniques.

At 504, the method includes determining whether or not to implement differential locking. Various factors may be taken into account when determining if differential locking is desired. For instance, differential locking may be initiated when a vehicle operator actuates a button, or other input device, indicating the operator's desire to lock the differential. In other examples, the differential may be locked when there is a vehicle traction imbalance between the drive wheels rotationally coupled to the differential. For instance, if drive wheel speed deviation surpasses a threshold value (e.g., 0.8 meters per second (m/s), 1.4 m/s, 2.2 m/s, etc.) differential locking may be initiated.

If it is determined that differential locking is not desired (NO at 504), the method moves to 506 where the method includes sustaining the differential locking mechanism in the unlocked or locked configuration.

If it is determined that differential locking is desired (YES at 504), the method advances to 508. At 508, the method includes energizing the solenoid actuator to trigger differential locking. For example, energization of the solenoid actuator may move the actuator's piston such that it urges a locking plate into engagement with a side gear which substantially prevents speed differentiation between the differential's side gears. As previously discussed, the energization may unfold in two stages, with the first stage having a greater current flow to the solenoid than the second stage.

At 510, the method includes periodically placing the control circuitry in the circuit board assembly in a lower power consuming state. A lower power consuming state may be a sleep state where the circuit consumes less power than in the activated state of the circuit. For instance, when the circuitry is put in the lower power consuming state (e.g., sleep state), the circuitry state may be held in memory (e.g., random access memory) and the other subsystems in the circuit and the memory may be placed in a low power state (e.g., minimum power state) which allows the memory to retain data. Thus in one example, the control circuitry may be put to sleep for a first duration and the activated state for a second duration. The first duration may be greater than the second duration, in one example. For instance, the first duration may be 70 milliseconds (ms) and the second duration may be 30 ms, in one use-case example. However, numerous suitable sleep durations have been envisioned. To allow differential locking and unlocking to unfold while putting the circuit cyclically to sleep, the time scale of the locking functionality may be greater than the duration of the lower power consuming state (e.g., sleep state). For instance, the locking differential control strategy may be operated on a time scale of one second or half of a second. In such an example, the sleep duration may be less than half a second. Further, in one example, the duration of the lower power consuming state may be adjusted based on operating conditions such as control circuitry temperature, ambient temperature, vehicle speed, vehicle load, combinations thereof, etc.

At 512, the method may include periodically implement sensing and/or control circuit diagnostics. For instance, degradation of the control circuit and/or sensing circuit may be ascertained via the diagnostic routines. Diagnostic routines for the internal circuitry, locking actuator position, solenoid actuator, and/or control circuitry interface may be implemented. Generally, a diagnostic routine may include ascertaining operating conditions based on sensor signals and/or condition modeling. The diagnostic routine may subsequently make a determination if one or more of operating conditions is not within a desired range, exceeds or falls below a threshold value, etc. and trigger a flag if the targeted operating condition(s) are not fulfilled. For instance, various aspects of the control circuitry (e.g., microcontroller) may be diagnosed such as the memory's validity, a program bug (e.g., undesirable programmatic operation), a program error (e.g., detected by a watch dog timer designed to generate a time-out signal based on an error), and/or an over-temperature condition of the circuit. Thus, in one example, an over-temperature diagnostic flag may be set when the circuit exceeds a threshold value. Aspects of the sensor such as the position sensor signal's range and/or the drive current's range exceeding targeted values may further be diagnosed. Features of the circuit's power drive may be diagnosed such as the power drive signal level and shorts in the output drive such as shorts to ground or shorts to the battery. For instance, one diagnostic routine may verify if a signal level capable of operating the power drive is present. Diagnostic techniques may further include diagnostics related to the locking actuator position, such as a strategy which decides if the actuator's sensed position is out of range. Other diagnostic techniques may include actuator diagnostics ascertaining if the actuator coil is open or if the actuator coil has shorted. The circuit's communication interface may further be diagnosed. As such in one exemplary diagnostic method, the logic may determine if a communication link has been lost or if the communication data is invalid.

At 514, the method may include sending and/or receiving messages from a vehicle controller. For instance, the circuit board assembly may send the vehicle ECU messages which indicate that the circuit board assembly has powered up, powered down, and/or is operational (e.g., passed a diagnostic test). Thus, the messages may be circuit board state updates that indicate the state of the circuit board assembly. In this way, the circuit board assembly may efficiently communicate with the vehicle ECU to increase data available to the ECU without unduly increasing processing resources used to gather and interpret the data from the differential's control circuitry. Method 500 allows the circuit board assembly to be operated with relatively small thermal margins, if desired, due to the reduction in heat generated by the circuitry. Method 500 further allows the solenoid actuator's control circuit to efficiently communicate with the vehicle ECU, if wanted, to decrease the computing resources the ECU devotes to the management of data from the differential system.

FIG. 6 illustrates a timing diagram 600 of a use-case control strategy for a differential system, such as the differential systems shown in FIGS. 1-4. However, the control strategy may be implemented via alternate suitable differential systems. In each graph of the timing diagram, time is indicated on the abscissa. The ordinate for plot 602 indicates the states ("Locked" and "Unlocked") of the differential's locking device. The ordinate for plot 604 indicates the states ("Activated" and "Sleep") of the control circuit.

At t1, the locking mechanism transitions from an unlocked state to a locked state. Further, as shown in plot 604, the control circuit is periodically placed in a sleep state which consumes less power than in the activated state. Thus, the control circuit may transition from a lower power state to a higher power state and vice versa. In this way, the control circuit may be periodically put to sleep while locking functionality remains active. The duration of the sleep state is indicated at 606 and the duration of the activated state is indicated at 608. To allow the control circuitry to be put to sleep while locking functionality remains active, the sleep duration 606 may be less than the time scale of the locking operation. For example, the sleep duration 606 may be 60-80 ms and the time scale of locking operation may be one second, in one use-case scenario. In this way, the control circuit may be periodically put in a lower power state to reduce the heat generated by the circuit while locking remains operational.

In the plots illustrated in FIG. 6, the sleep and activation durations remain substantially unchanged. However, in other embodiments, the lengths of the durations of the circuit's activation and sleep states may be dynamically adjusted based on or more operating conditions, such as circuit temperature, ambient temperature, the circuit's programmatic control strategy, and the like. For example, responsive to an increase in circuit temperature, the duration of the sleep state may be increased, to reduce the circuit's temperature and the likelihood of a circuit over-temperature condition. In other examples, the duration of the sleep state may be decreased responsive to a decrease in circuit temperature and/or ambient temperature. In this way, the length of the sleep duration may be dynamically increased and/or deceased based on changes in the differential system, vehicle, and/or operating environment.

The systems and methods described herein have the technical effect of increasing the circuit board assembly's packaging efficiency as well as increasing the circuit board's longevity through a reduction in the circuit's operating temperature. The systems and methods described herein may further have the technical effect of increasing the precision of differential locker control.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements having a continuous shape may be referred to as such, in on example. Further in another example, elements having a monolithic shape may be referred to as such. As used herein, the terms "substantially" and "approximately" are construed to mean plus or minus five percent or less of the range or value unless otherwise specified.

The invention will be further described in the following paragraphs. In one aspect, a differential system is provided that comprises an electromagnetic solenoid actuator including a coil assembly and a piston and configured to selectively induce locking and unlocking of axle shaft speed differentiation; and a circuit board assembly configured to programmatically control the electromagnetic solenoid actuator and including control circuitry and a sensor that is configured to sense a position of the piston and radially extends down a face of the coil assembly; wherein the sensor and the control circuitry are enclosed in a sealed housing.

In another aspect, a method for operation of a differential system is provided that comprises at a circuit board assembly that is directly coupled to a coil assembly in an electromagnetic solenoid actuator, selectively locking and unlocking speed differentiation between a pair of axle shafts based on signals from a sensor included in the circuit board assembly; and periodically placing control circuitry in the circuit board assembly in a lower power consuming state for a selected duration. In one example, the method may further comprise adjusting a length of the selected duration based one or more operating conditions. In a further example, the method may additionally comprise sending a circuit board state update to a vehicle ECU via a CAN or a LIN. In another example, the method may further comprise implementing at least one of a sensor diagnostic routine and electromagnetic solenoid actuator diagnostic routine to determine if the sensor and/or the electromagnetic solenoid actuator has been degraded.

In yet another aspect, a locking differential system is provided that comprises an electromagnetic solenoid actuator including a coil assembly and a piston and configured to selectively induce locking and unlocking of axle shaft speed differentiation; and a circuit board assembly configured to programmatically control the electromagnetic solenoid actuator and including control circuitry and a sensor that is configured to sense a position of the piston and extends down a face of the coil assembly from a housing section that includes a planar surface; wherein the sensor and the control circuitry are enclosed in a continuous housing; and wherein the circuit board assembly includes executable instructions stored in non-transitory memory that cause the circuit board assembly to periodically transition the circuit board assembly between an activated state and a sleep state.

In any of the aspects or combinations of the aspects, the circuit board assembly may include executable instructions stored in non-transitory memory that cause the circuit board assembly to: periodically place the circuit board assembly in a lower power consuming state for a selected duration.

In any of the aspects or combinations of the aspects, the circuit board assembly may include executable instructions stored in the non-transitory memory that cause the circuit board assembly to send a circuit board state update to a vehicle controller.

In any of the aspects or combinations of the aspects, the circuit board assembly may include executable instructions stored in the non-transitory memory that cause the circuit board assembly to adjust the selected duration based on one or more operating conditions.

In any of the aspects or combinations of the aspects, the circuit board assembly may be periodically placed in the lower power consuming state while the electromagnetic solenoid actuator is in a locked configuration.

In any of the aspects or combinations of the aspects, the sensor may be arranged perpendicular to the control circuitry.

In any of the aspects or combinations of the aspects, the circuit board assembly may include a continuous base that comprises an upper section and a side section that radially extends towards a central axis of the differential system from the upper section.

In any of the aspects or combinations of the aspects, the sensor and the face of the coil assembly may be parallel to one another.

In any of the aspects or combinations of the aspects, the electromagnetic solenoid actuator may further comprise a housing at least partially circumferentially enclosing the coil assembly and the piston; wherein the housing may include a cut-out that mates with and seals at least a portion of the sealed housing.

In any of the aspects or combinations of the aspects, the circuit board assembly may include a LIN wiring harness.

In any of the aspects or combinations of the aspects, the control circuitry may be spaced away from an outer circumferential surface of the coil assembly and the sealed housing may include a circuit board cover that extends laterally away from the sensor.

In any of the aspects or combinations of the aspects, the control circuitry may be arranged on an upper side of the electromagnetic solenoid actuator spaced away from a lubricant reservoir.

In any of the aspects or combinations of the aspects, the circuit board state update may be sent to the vehicle controller during operation of the circuit board assembly in an activated state.

In any of the aspects or combinations of the aspects, selectively locking speed differentiation between the pair of axle shafts may include, in a first stage, energizing the coil assembly with a higher current and, in a second stage, energizing the coil assembly with a lower current.

In any of the aspects or combinations of the aspects, the circuit board assembly may include a wiring harness with a plurality of wire ports that are arranged along an axis parallel to a central axis of the locking differential system.

In another representation, a differential locker is provided which comprises an electromagnetic solenoid configured to actuate a locking gear and collocated with sensing, control, and diagnostic circuitry that is sealed in a monolithic housing coupled to a face on an interior axial side of the electromagnetic solenoid, wherein the sensing, control, and diagnostic circuity is configured to initiate locking and unlocking of the locking gear and determine a position of the electromagnetic solenoid.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A method for operation of a differential system, comprising:
at a circuit board assembly that is directly coupled to a coil assembly in an electromagnetic solenoid actuator, selectively locking and unlocking speed differentiation between a pair of axle shafts based on signals from a sensor included in the circuit board assembly; and
periodically placing control circuitry in the circuit board assembly in a lower power consuming state for a duration which is less than a duration of locking or unlocking speed differentiation.

2. The method of claim 1, further comprising adjusting a length of the duration of the lower power consuming state based one or more operating conditions.

3. The method of claim 1, further comprising sending a circuit board state update to a vehicle controller via a controller area network (CAN) or a local interconnect network (LIN).

4. The method of claim 3, wherein the circuit board state update is sent to the vehicle controller during operation of the circuit board assembly in an activated state.

5. The method of claim 1, wherein selectively locking speed differentiation between the pair of axle shafts includes, in a first stage, energizing the coil assembly with a higher current and, in a second stage, energizing the coil assembly with a lower current.

6. The method of claim 1, further comprising implementing at least one of a sensor diagnostic routine and electromagnetic solenoid actuator diagnostic routine to determine if the sensor and/or the electromagnetic solenoid actuator has been degraded.

7. The method of claim 1, wherein the control circuitry is repeatedly cycled between the lower power consuming state and a higher power consuming state.

8. The method of claim 1, wherein periodically placing the control circuitry in the lower power consuming state comprises cycling between the lower power consuming state and a higher power consuming state.

9. The method of claim 1, wherein the duration of the lower power consuming state is less than half a second.

10. The method of claim 9, wherein, in the lower power consuming state, a state of the control circuitry is stored in memory and the remaining systems of the control circuitry are placed in a minimum power consuming state.

11. A method for operation of a differential system, comprising:
providing a circuit board assembly that is directly coupled to a coil assembly in an electromagnetic solenoid actuator, the circuit board assembly enclosed and sealed in a first housing that mates with a cut-out of a second housing that encloses the coil assembly and a piston of the actuator, the cut-out sealing at least a portion of the first housing;
selectively locking and unlocking speed differentiation between a pair of axle shafts based on signals from a sensor included in the circuit board assembly; and
periodically placing control circuitry in the circuit board assembly in a lower power consuming state for a selected duration.

12. The method of claim 11, further comprising adjusting a length of the selected duration based one or more operating conditions, including a temperature.

13. The method of claim 11, wherein selectively locking speed differentiation between the pair of axle shafts includes, in a first stage, energizing the coil assembly with a higher current and, in a second stage, energizing the coil assembly with a lower current.

14. The method of claim 11, wherein the control circuitry is repeatedly cycled between the lower power consuming state and a higher power consuming state.

15. The method of claim 11, wherein periodically placing the control circuitry in the lower power consuming state comprises cycling between the lower power consuming state and a higher power consuming state, and wherein a duration of the lower power consuming state is less than a duration of locking or unlocking speed differentiation.

16. The method of claim 11, wherein the duration of the lower power consuming state is less than half a second.

17. The method of claim 11, wherein, in the lower power consuming state, a state of the control circuitry is stored in memory and systems of the control circuitry other than the memory are placed in a minimum power consuming state.

* * * * *